Oct. 2, 1951
E. E. TAYLOR
2,569,787
WHEEL SUSPENSION
Filed July 1, 1949
2 Sheets-Sheet 1
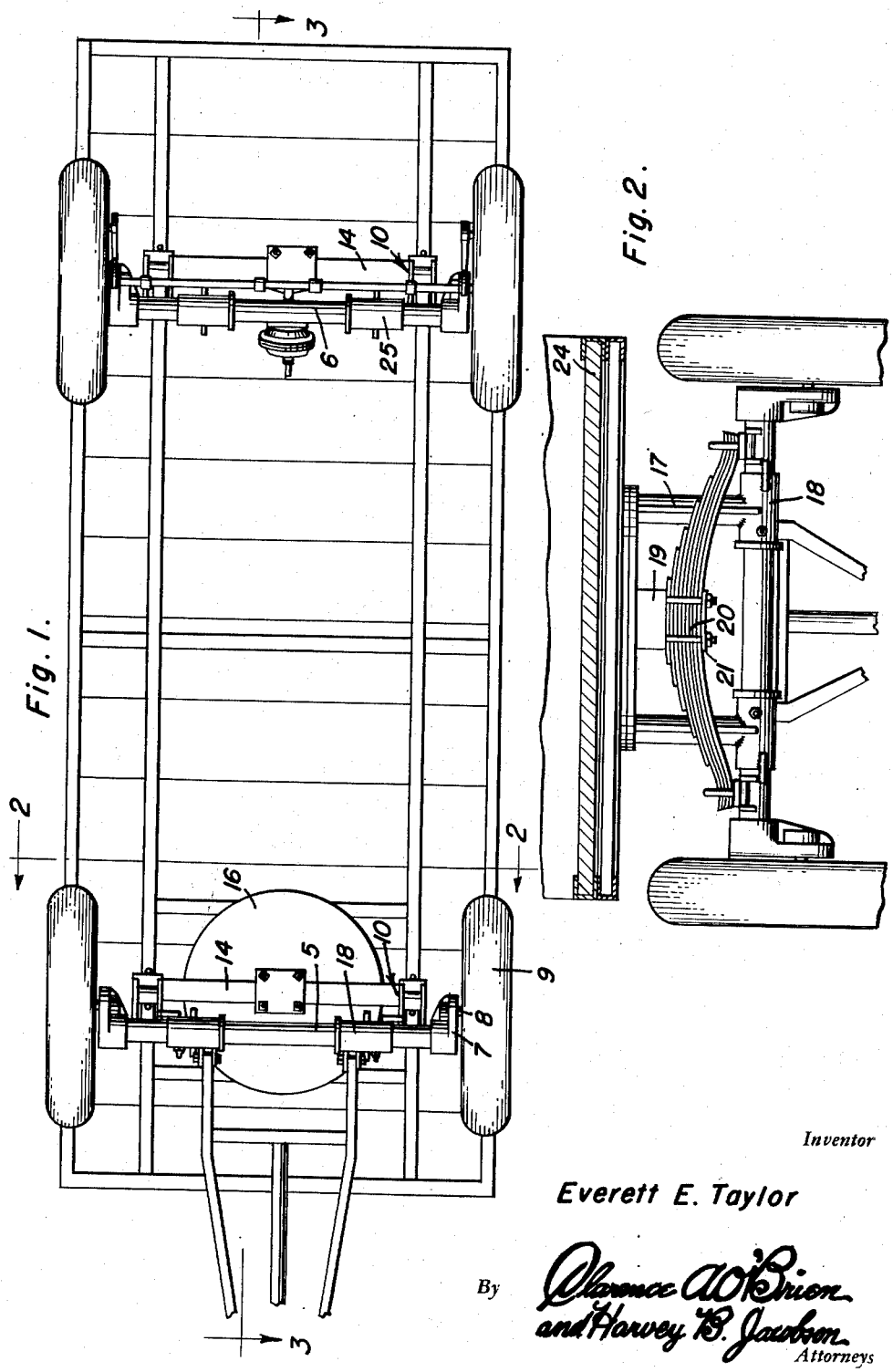
Inventor
Everett E. Taylor Oct. 2, 1951  E. E. TAYLOR  2,569,787
WHEEL SUSPENSION
Filed July 1, 1949
2 Sheets—Sheet 2
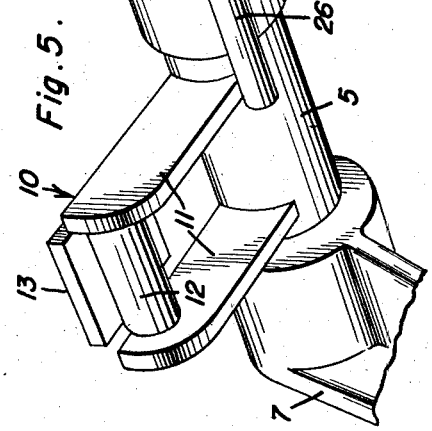
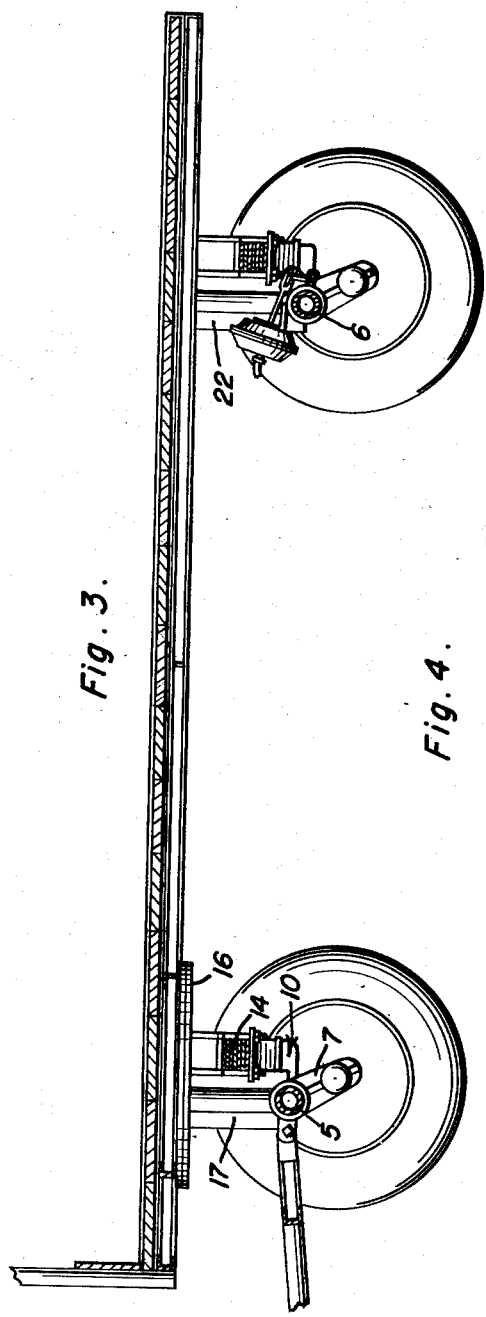
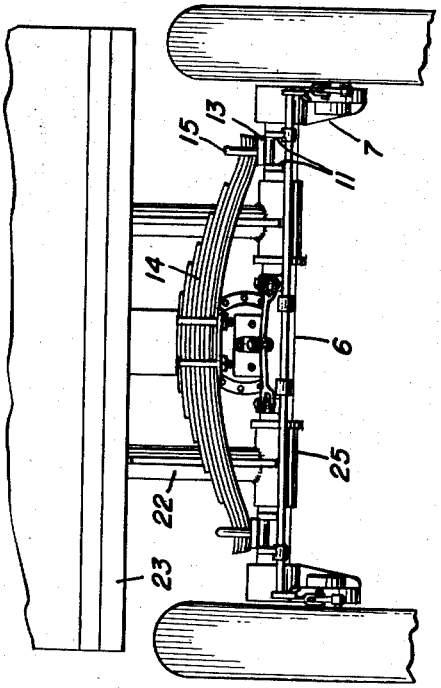
Inventor
Everett E. Taylor Patented Oct. 2, 1951

2,569,787

UNITED STATES PATENT OFFICE 2,569,787

WHEEL SUSPENSION

Everett E. Taylor, Lindsay, Calif.

Application July 1, 1949, Serial No. 102,624

3 Claims. (Cl. 267—19)

The present invention relates to new and useful improvements in wheel suspension for vehicles and more particularly to wheel suspension means for trailers.

An important object of this invention is to provide an axle construction by means of which a uniform wheel action is provided to maintain the trailer body level and thus stabilize the load and reduce side sway.

A further object of the invention is to provide a novel spring mounting for the axle.

Another object is to provide a device of this character of simple and practical construction, which is strong and durable, efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a bottom plan view;

Figure 2 is a transverse sectional view taken on a line 2—2 of Figure 1;

Figure 3 is a longitudinal sectional view taken on a line 3—3 of Figure 1;

Figure 4 is a rear elevational view; and

Figure 5 is an enlarged fragmentary perspective view showing one of the spring perches carried by the axle.

Referring now to the drawings in detail, wherein for the purpose of illustration I have disclosed a preferred embodiment of the invention, the numerals 5 and 6 designate the front and rear axles, respectively, of a vehicle, such as a trailer or the like, the axles being of duplicate construction and, accordingly, a detailed explanation of one will suffice for both.

The end of each axle is provided with a downwardly and rearwardly inclined spindle arm 7 having a spindle 8 at its lower end on which a wheel 9 is journaled.

A spring perch designated generally at 10 comprises a pair of spaced parallel arms 11 welded or otherwise suitably secured at one end to the axle and projecting rearwardly therefrom in substantially horizontal position and acute angled relation to the adjacent spindle arm 7. A cross bar 12 is welded or otherwise suitably secured between the outer or rear ends of arms 11 and a plate 13 is welded or otherwise suitably secured to the cross bar 12, and to which one end of a semi-elliptical leaf spring 14 is secured by a U-bolt 15, the spring extending longitudinally or parallel with respect to the axle.

The front axle 5 is connected to the fifth wheel 16 of the trailer by means of a pair of hangers 17 welded or otherwise suitably secured at their upper ends to the fifth wheel and to the lower ends of which bearings or sleeves 18 are welded and in which the axle is rockably journaled. The spring for the front axle assembly is also connected to the fifth wheel 16 by means of a block 19 welded or otherwise suitably secured under the fifth wheel and connected to the central portion of the spring by bolts 20 extending downwardly from the block and securing a clamping plate 21 under the spring.

The assembly for the rear axle 6 is likewise provided with a pair of vertical hangers 22 welded or otherwise suitably secured at their upper ends to the frame 23 for the body 24 of the trailer, the hangers 22 likewise having their lower ends welded to sleeves or bearings 25 in which the rear axle 6 is rockably journaled.

Stop rods 26 are welded in a horizontal position to bearings 18 and 25 for the front and rear assemblies, with one end of the rods underlying the adjacent arms 11 to limit downward swinging movement of arms 7 and arms 11 in a reverse or rebound action of the assemblies.

Having described the invention, what is claimed as new is:

1. A wheel suspension comprising an axle, hangers rockably supporting the axle, spindle arms at the ends of the axle, spring perches projecting radially from the axle in horizontal position and acute angled relation to the spindle arms, and a leaf spring connected at its ends to said perches and supported on top thereof.

2. A wheel suspension comprising an axle, hangers rockably supporting the axle, spindle arms at the ends of the axle, spring perches projecting radially and horizontally from the axle, and each comprising a pair of spaced parallel perch arms, a horizontal plate fixed on the outer ends of each pair of perch arms, and a leaf spring connected at its ends to the plates and supported thereon.

3. A wheel suspension comprising an axle, hangers rockably supporting the axle, spindle arms at the ends of the axle, spring perches projecting radially and horizontally from the axle and each comprising a pair of spaced parallel perch arms, a leaf spring connected at its ends to the outer ends of each pair of perch arms, and stop pins carried by the hangers and each underlying one of the pairs of perch arms to limit downward movement of the perch arms.

EVERETT E. TAYLOR.

REFERENCES CITED

The following references are of record in the file of this patent:

UNITED STATES PATENTS

| Number | Name | Date |
| --- | --- | --- |
| 1,757,758 | Junkin | May 6, 1930 |
| 2,153,237 | Clark | Apr. 4, 1939 |
| 2,164,602 | Valletta | July 4, 1939 |
| 2,164,470 | Opolo | July 4, 1939 |

FOREIGN PATENTS

| Number | Country | Date |
| --- | --- | --- |
| 193,811 | Switzerland | Jan. 17, 1938 |